(12) United States Patent
Evans et al.

(10) Patent No.: US 11,261,380 B2
(45) Date of Patent: *Mar. 1, 2022

(54) AEROGEL COMPOSITIONS FOR HIGH TEMPERATURE APPLICATIONS

(71) Applicant: Aspen Aerogels, Inc., Northborough, MA (US)

(72) Inventors: Owen R. Evans, Chelmsford, MA (US); Wendell E. Rhine, Belmont, MA (US); Jon F. Nebo, Waltham, MA (US); Jon C. Abeles, Jr., Westborough, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/664,256

(22) Filed: Oct. 25, 2019

(65) Prior Publication Data

US 2020/0061569 A1   Feb. 27, 2020

Related U.S. Application Data

(63) Continuation of application No. 14/875,786, filed on Oct. 6, 2015, now Pat. No. 10,487,263, which is a continuation of application No. 11/753,815, filed on May 25, 2007, now Pat. No. 9,181,486.

(60) Provisional application No. 60/865,324, filed on Nov. 10, 2006, provisional application No. 60/803,189, filed on May 25, 2006.

(51) Int. Cl.
| | |
|---|---|
| *C09K 21/02* | (2006.01) |
| *C09K 21/12* | (2006.01) |
| *B01J 13/00* | (2006.01) |
| *C01B 25/26* | (2006.01) |
| *C01B 33/158* | (2006.01) |
| *C01B 33/26* | (2006.01) |
| *C01F 5/14* | (2006.01) |
| *C01F 7/18* | (2006.01) |

(52) U.S. Cl.
CPC ............ *C09K 21/02* (2013.01); *B01J 13/0091* (2013.01); *C01B 25/26* (2013.01); *C01B 33/1585* (2013.01); *C01B 33/26* (2013.01); *C01F 5/14* (2013.01); *C01F 7/18* (2013.01); *C09K 21/12* (2013.01)

(58) Field of Classification Search
CPC ...... C09K 21/02; C09K 21/12; B01J 13/0091; C01B 25/26; C01B 33/1585; C01B 33/26; C01F 5/14; C01F 7/18; B32B 2266/126
USPC .......... 428/221, 304.4, 311.11, 317.9, 318.4, 428/319.1; 264/603, 621
See application file for complete search history.

(56) References Cited

U.S. PATENT DOCUMENTS

| | | |
|---|---|---|
| 1,972,188 A | 9/1934 | Gitzen |
| 2,188,007 A | 1/1940 | Kistler |
| 3,238,185 A | 3/1966 | Neuse |
| 3,341,495 A | 9/1967 | Neuse |
| 3,350,369 A | 10/1967 | Rosenberg et al. |
| 3,437,634 A | 4/1969 | Neuse |
| 3,673,232 A | 6/1972 | Talbot et al. |
| 3,770,787 A | 11/1973 | Burnett |

(Continued)

*Primary Examiner* — Matthew D Matzek
(74) *Attorney, Agent, or Firm* — Christopher Stow; Poogs Muthukumaran; Paul A. Smith

(57) ABSTRACT

Aerogel materials, aerogel composites and the like may be improved by enhancing their smoke suppression, combustion reduction properties. It is additionally useful to provide aerogel based composites compatible with environments conducive to combustion. Such aerogel materials and methods of manufacturing the same are described.

23 Claims, 1 Drawing Sheet

(56) References Cited

U.S. PATENT DOCUMENTS

| | | | |
|---|---|---|---|
| 4,028,333 A | 6/1977 | Lindvay | |
| 4,109,067 A | 8/1978 | Deets | |
| 4,115,353 A | 9/1978 | Deets | |
| 4,302,553 A | 11/1981 | Frisch et al. | |
| 4,363,738 A | 12/1982 | Kummermehr | |
| 4,400,340 A | 8/1983 | Klosiewicz | |
| 4,447,345 A | 5/1984 | Kummermehr et al. | |
| 4,598,116 A | 7/1986 | Koegh et al. | |
| 4,610,863 A | 9/1986 | Tewari et al. | |
| 4,619,908 A | 10/1986 | Cheng et al. | |
| 4,667,417 A | 5/1987 | Graser et al. | |
| 4,673,614 A | 6/1987 | Wells et al. | |
| 4,680,334 A | 7/1987 | Wallace | |
| 4,717,708 A | 1/1988 | Cheng et al. | |
| 4,762,700 A | 9/1988 | Huggins | |
| 4,859,365 A | 8/1989 | Peninger | |
| 4,873,218 A | 10/1989 | Pekala | |
| 4,966,919 A | 6/1990 | Williams et al. | |
| 4,935,479 A | 7/1990 | Lau et al. | |
| 4,954,327 A | 9/1990 | Blount | |
| 4,997,804 A | 3/1991 | Pekala | |
| 5,081,163 A | 1/1992 | Pekala | |
| 5,086,085 A | 2/1992 | Pekala | |
| 5,124,101 A | 6/1992 | Hirao et al. | |
| 5,137,659 A | 8/1992 | Ashley et al. | |
| 5,149,764 A | 9/1992 | Lau et al. | |
| 5,156,895 A | 10/1992 | Martin | |
| 5,252,654 A | 10/1993 | David et al. | |
| 5,254,638 A | 10/1993 | Novak et al. | |
| 5,275,796 A | 1/1994 | Tillotson et al. | |
| 5,292,851 A | 3/1994 | Lau et al. | |
| 5,306,555 A | 4/1994 | Ramamurthi et al. | |
| 5,346,938 A | 9/1994 | Termine et al. | |
| 5,378,753 A | 1/1995 | Brown | |
| 5,378,790 A | 1/1995 | Michalczyk et al. | |
| 5,420,168 A | 3/1995 | Mayer et al. | |
| 5,409,980 A * | 4/1995 | Myszak, Jr. | C08K 3/2279 524/409 |
| 5,412,016 A | 5/1995 | Sharp | |
| 5,412,043 A | 5/1995 | Novak et al. | |
| 5,476,878 A | 12/1995 | Pekala | |
| 5,478,867 A | 12/1995 | Tabor | |
| 5,484,818 A | 1/1996 | DeVos et al. | |
| 5,508,341 A | 4/1996 | Mayer et al. | |
| 5,538,931 A | 7/1996 | Heinrichs et al. | |
| 5,544,487 A | 8/1996 | Attey et al. | |
| 5,548,051 A | 8/1996 | Michalczyk et al. | |
| 5,565,142 A | 10/1996 | Deshpande et al. | |
| 5,569,513 A | 10/1996 | Fidler et al. | |
| 5,720,785 A | 2/1998 | Baker | |
| 5,728,785 A | 3/1998 | Grubbs et al. | |
| 5,738,801 A | 4/1998 | Ziegler et al. | |
| 5,786,059 A | 7/1998 | Frank et al. | |
| 5,789,075 A | 8/1998 | Frank et al. | |
| 5,811,532 A | 9/1998 | House | |
| 5,830,387 A | 11/1998 | Yokogawa et al. | |
| 5,866,027 A | 2/1999 | Frank et al. | |
| 5,868,966 A | 2/1999 | Wei et al. | |
| 5,869,545 A | 2/1999 | Biesmans et al. | |
| 5,879,796 A | 4/1999 | David | |
| 5,942,513 A | 8/1999 | Bigge et al. | |
| 5,955,525 A * | 9/1999 | Sanchez | H01B 3/441 524/264 |
| 5,962,539 A | 10/1999 | Perrut et al. | |
| 5,972,254 A | 10/1999 | Sander | |
| 5,973,015 A | 10/1999 | Coronado et al. | |
| 5,990,184 A | 11/1999 | Biesmans et al. | |
| 6,020,443 A | 2/2000 | Woodson et al. | |
| 6,068,882 A | 5/2000 | Ryu | |
| 6,080,475 A | 6/2000 | Frank et al. | |
| 6,083,619 A | 7/2000 | Frank et al. | |
| 6,087,407 A | 7/2000 | Coronado et al. | |
| 6,127,306 A | 10/2000 | Husing et al. | |
| 6,136,216 A | 10/2000 | Fidler et al. | |
| 6,140,377 A | 10/2000 | Schwertfeger et al. | |
| 6,187,250 B1 | 2/2001 | Champagne | |
| 6,197,270 B1 | 3/2001 | Sonada et al. | |
| 6,271,292 B1 | 8/2001 | Mager et al. | |
| 6,303,046 B1 | 10/2001 | Risen et al. | |
| 6,315,971 B1 | 11/2001 | Wallace et al. | |
| 6,318,124 B1 | 11/2001 | Rutheford et al. | |
| 6,433,049 B1 | 8/2002 | Romenesko et al. | |
| 6,479,416 B1 | 11/2002 | Frank et al. | |
| 6,528,153 B1 | 3/2003 | Benzing et al. | |
| 6,566,456 B1 | 5/2003 | Yang et al. | |
| 6,620,355 B1 | 9/2003 | Schmidt | |
| 6,656,527 B1 | 12/2003 | Gessner et al. | |
| 6,670,402 B1 | 12/2003 | Lee et al. | |
| 6,686,035 B2 | 2/2004 | Jiang et al. | |
| 6,737,456 B2 | 5/2004 | Bar-Yakov et al. | |
| 6,770,584 B2 | 8/2004 | Barney et al. | |
| 6,825,260 B2 | 11/2004 | Sievers et al. | |
| 6,887,563 B2 | 5/2005 | Frank et al. | |
| 6,989,123 B2 | 1/2006 | Lee et al. | |
| 7,078,359 B2 | 7/2006 | Stepanian et al. | |
| 7,399,439 B2 | 7/2008 | Lee et al. | |
| 7,504,346 B2 | 3/2009 | Stepanian et al. | |
| 7,780,890 B2 | 8/2010 | Lee et al. | |
| 8,214,980 B2 | 7/2012 | Bullock et al. | |
| 2001/0034375 A1* | 10/2001 | Schwertfeger | B01J 13/0091 516/98 |
| 2002/0094426 A1 | 7/2002 | Stepanian et al. | |
| 2002/0173571 A1 | 11/2002 | Tour et al. | |
| 2003/0077438 A1 | 4/2003 | Frank et al. | |
| 2003/0176396 A1 | 9/2003 | Shea et al. | |
| 2004/0034203 A1 | 2/2004 | Brook et al. | |
| 2004/0132845 A1 | 7/2004 | Rhine et al. | |
| 2004/0132846 A1 | 7/2004 | Leventis et al. | |
| 2004/0191516 A1 | 9/2004 | Jiang et al. | |
| 2004/0214358 A1 | 10/2004 | Negley | |
| 2005/0046086 A1* | 3/2005 | Lee | B29C 39/18 264/444 |
| 2005/0142605 A1 | 6/2005 | Malak | |
| 2005/0192366 A1 | 9/2005 | Ou et al. | |
| 2005/0192367 A1 | 9/2005 | Ou et al. | |
| 2005/0220988 A1 | 10/2005 | Dodolet et al. | |
| 2007/0152363 A1 | 7/2007 | Begag et al. | |
| 2009/0199991 A1 | 8/2009 | Aufderheide | |
| 2012/0097907 A1 | 4/2012 | Bauer et al. | |

* cited by examiner

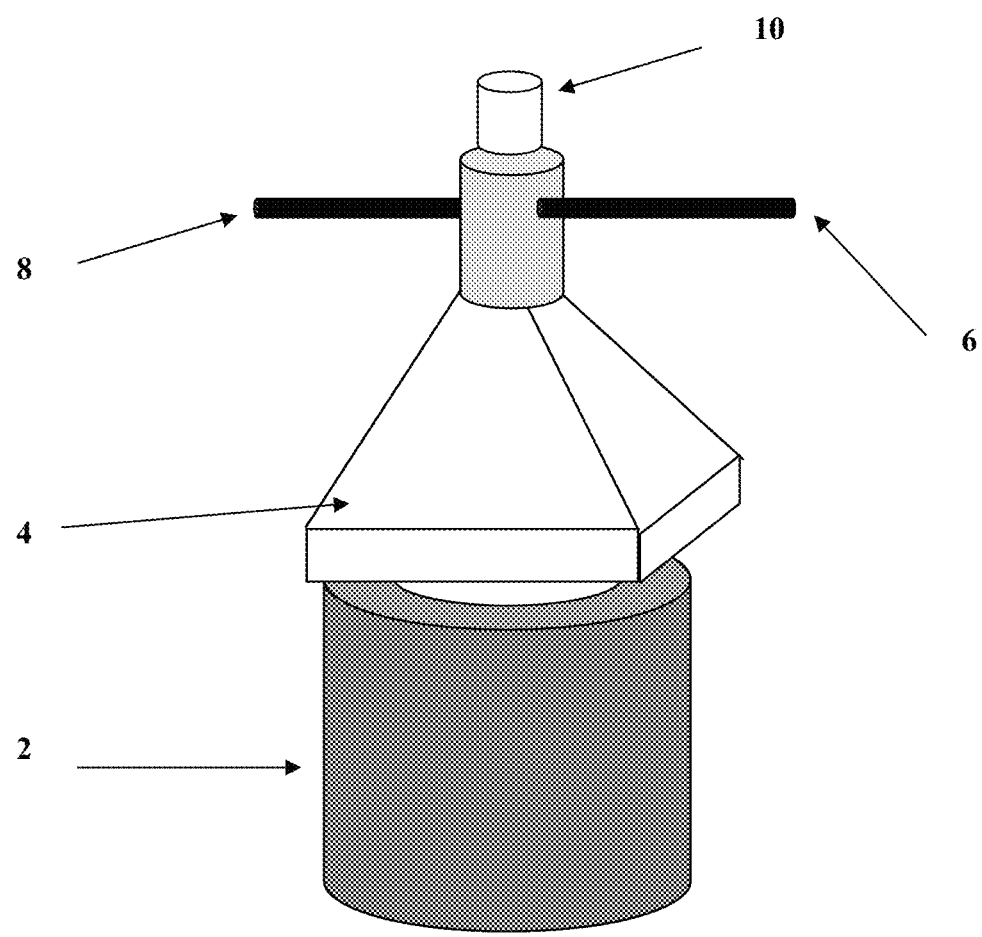

AEROGEL COMPOSITIONS FOR HIGH TEMPERATURE APPLICATIONS

CROSS-REFERENCES TO RELATED APPLICATIONS

This application is a continuation of U.S. patent application Ser. No. 14/875,786 filed Oct. 6, 2015; which is a continuation of U.S. patent application Ser. No. 11/753,815 filed May 25, 2007, both of which claim benefit of priority from U.S. Provisional Patent Application Ser. Nos. 60/803,189 filed May 25, 2006 and 60/865,324 filed Nov. 10, 2006; all of which are incorporated herein by reference in their entirety.

FIELD OF INVENTION

The present invention relates to aerogels providing enhanced performance and specifically in the area of smoke, fire or flame suppression and reduced combustibility.

SUMMARY OF THE INVENTION

Embodiments of the present invention describe aerogel materials providing enhanced performance and specifically in the area of smoke, fire or flame suppression and reduced combustibility. Such materials may comprise smoke, fire or flame suppressing fillers. In some embodiments at least some of the fillers also behave as fire retardants. The fillers may comprise: phosphates, borates, metal silicates, metallocenes, molybdates, stannates, hydroxides, carbonates, zinc oxides, aluminum oxides, antimony oxides, magnesium-zinc blends, magnesium-zinc-antimony blends, or a combination thereof.

At least some of the fillers may be in hydrated form. Suitable phosphate fillers comprise cyclic phosphates, alkylphosphates, ammonium polyphosphates, arylphosphates, alkylarylphosphates or a combination thereof. Specific examples of preferred phosphates include triethyl phosphate, tributyl phosphate, trihexyl phosphate, tridecyl phosphate, tri(2-ethylhexyl) phosphate, trioctyl phosphate, hexyldioctyl phosphate, and the like. In one embodiment phosphate fillers have the general formula:

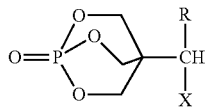

wherein: X=OH, OR', OC(O)R' or OC(O)NC$_3$Si(OEt)$_3$;
R=H, a saturated or unsaturated straight-chain or branched-chain C$_1$-C$_{17}$ alkyl, most preferably C$_1$-C$_3$; and
R' is a saturated or unsaturated C$_1$-C$_{17}$ alkyl, most preferably C$_1$-C$_3$. The aerogel material preferably comprises phosphate fillers at a level of about 1 to 30 percent all by weight of the final composition.

In another embodiment, the borate fillers comprise Magnesium, Sodium, Calcium, Zinc, Tantalum, Nickel, Titanium, Cerium, Potassium, Beryllium, Lithium, Antimony, Aluminum, Manganese, Copper, Strontium, Iron, ammonia or a combination thereof. Largest dimension of the borate fillers is less than about 100 μm, less than about 50 μm, less than about 10 μm or less than about 5 μm. The aerogel material preferably comprises less than about 50%, less than about 30%, less than about 20%, less than about 10% or less than about 5% by weight of borate fillers. In another embodiment, the metal silicate fillers comprise Beryllium, Magnesium, Calcium, Strontium, Barium, Radium, Aluminum, Iron, Titanium, Manganese, Potassium, Sodium or a combination thereof. Preferably the largest dimension of the metal silicate fillers is less than about 100 μm, less than about 50 μm, less than about 10 μm or less than about 5 μm. Also preferably, the aerogel material comprises less than about 50%, less than about 30%, less than about 20%, less than about 10% or less than about 5% by weight of metal silicate fillers. In another embodiment the metallocene fillers comprise Chromium, Cobalt, Hafnium, Iron, Titanium, Vanadium, Ruthenium, Rhodium, Zirconium, Tungsten, Molybdenum, Osmium, or Nickel. In a further embodiment the metallocene fillers have a chemical structure:

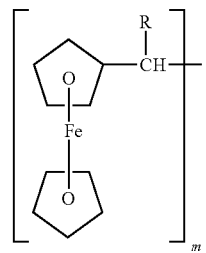

wherein m=an integer greater than 2 (i.e. 2, 3, 4 . . . ); and R=hydrogen, low molecular weight alkyl groups, aryl, alkylaryl, phenyl, methyl, phenyl, or alkylphenyl. Preferably the largest dimension of the metallocene fillers is less than about 100 μm, less than about 50 μm, less than about 10 μm or less than about 5 μm. Also preferably, aerogel material comprises less than about 50%, less than about 30%, less than about 20%, less than about 10% or less than about 5% by weight of metallocene fillers. In yet another embodiment, the molybdate fillers comprise: MoS$_2$, MoO$_3$, CaMoO$_4$, Mo$_2$O$_5$, MoS$_3$, Mo$_2$S$_3$, Mo$_2$, O$_3$, MoO$_2$, MoS$_4$, MoCl$_3$, MoBr$_3$, PbMoO$_4$, ammonium 5-molybdocobaltate (III), 9-molybdonickelate (IV), 6-molybdoaluminate (III), 6-molybdochromate (III), ammonium dimolybdate, ammonium molybdate, ammonium heptamolybdate, ammonium octamolybdate, ammonium phosphomolybdates, alkali metal molybdates, alkaline earth molybdates or a combination thereof. Preferably, the largest dimension of the molybdate fillers is less than about 100 μm, less than about 50 μm, less than about 10 μm or less than about 5 μm. Also preferably, the aerogel material comprises less than about 50%, less than about 30%, less than about 20%, less than about 10% or less than about 5% by weight of molybdate fillers. In some embodiments, the aerogel material itself is based on Silica, Alumina, Titania, Zirconia, Yttria, Hafnia or a combination thereof and may further comprise a fibrous structure. Said fibrous structure may comprise organic polymer-based fibers, inorganic fibers or a combination thereof and in forms of a woven, non-woven, mat, felt, batting (e.g. lofty batting), chopped fibers or a combination thereof form. A corresponding method of preparing aerogel materials with smoke suppressing fillers comprises the steps of:
(a) forming a gel from a mixture comprising gel precursors and smoke suppressing fillers; and
(b) drying the gel.
Accordingly, said smoke suppressing fillers comprise: phosphates, borates, metal silicates, metallocenes, molybdates, stannates, hydroxides, carbonates, zinc oxides, aluminum oxides, antimony oxides, magnesium-zinc blends, magnesium-zinc-antimony blends, or a combination thereof. At least some of the smoke suppressing fillers may be in hydrated form. Step (a) may also include dispensing an amount of smoke suppressing fillers into a gel precursor solution, thereby forming a mixture, mixing an amount of a smoke suppressing filler with an amount of gel precursor in a suitable solvent; dispensing a mixture comprising the fillers and gel precursors, into a fibrous structure or a combination thereof. Alternatively the step of introducing a fibrous structure into the mixture comprising the fillers and gel precursors may be carried out. As before, the fibrous structure comprises organic polymer-based fibers, inorganic fibers or a combination thereof and in forms of a mat, felt, batting (e.g. lofty batting) or a combination thereof. Said gel precursors may comprise Silica, Titania, Zirconia, Alumina, Hafnia, Yttria, Ceria, or a combination thereof. Drying is preferably carrier out via a supercritical fluid such as but not limited to supercritical $CO_2$. As before largest dimension of the fillers used in the steps above is less than about 100 μm, less than about 50 μm, less than about 10 μm or less than about 5 μm. Also, the filler content of the dried gel is preferably less than about 50%, less than about 30%, less than about 20%, less than about 10% or less than about 5% by weight. Corresponding aerogel materials and articles of manufacture comprising the same are low smoke emitting and optionally fire resistant.

BRIEF DESCRIPTION OF DRAWINGS

FIG. 1 presents an apparatus for measuring the Smoke Density Index (SDI) for aerogels and aerogel composites of the present invention.

DESCRIPTION

Since their discovery, aerogels have been regarded as one of the best thermal insulating materials ever known. Development of thermal or fire barrier articles based on aerogels continues to be an area of high interest, but with major challenges. First, the fragile structure of an aerogel (low density and high porosity) poses several difficulties in conforming to irregular surfaces or maintaining integrity in dynamic conditions. Second, when enduring a high heat flux or fire, combustion by-products such as smoke may be generated from an aerogel. This is particularly undesirable when said articles are placed in enclosed areas proximal to human occupants. Flexible, fiber-reinforced aerogels such as that commercially available from Aspen Aerogels Inc. (Northborough, Mass.) represent an effective solution for providing conformable aerogels. Still an unmet need exists for mitigation of smoke and other combustion by-products from aerogels. Yet another unmet need is an aerogel product which is hydrophobic and still substantially non-combustible under combustible conditions such as high temperatures or oxygen rich environments.

Embodiments of the present invention describe aerogels with reduced smoke emission, reduced combustion, increased compatibility with combustible environments. Smoke may arise from various components, or additives in an aerogel when exposed to high thermal events such as fire. In most cases hydrocarbon-based compounds from a component of the aerogel network, from surface modification/functionalization adducts, or from un-bonded organic additives or impurities can be responsible for generation of smoke or combustion. In one aspect, the present invention involves aerogel materials comprising smoke suppressing fillers. As such, the smoke suppressing fillers described herein are distinct from the aerogel matrix in which they are embedded. In a further aspect, smoke suppressing fillers are dispersed in a gel precursor solution where upon polymerization (gel formation) and drying the former is incorporated within an aerogel. In an even further aspect the fillers provide added functionality in the way of smoke suppression.

Within the context of embodiments of the present invention "aerogels" or "aerogel materials" along with their respective singular forms, refer to gels containing air as a dispersion medium in a broad sense, and gels dried with supercritical fluids in a narrow sense. The chemical composition of aerogels can be inorganic, organic (including polymers) or hybrid organic-inorganic. Inorganic aerogels may be based on Silica, Titania, Zirconia, Alumina, Hafnia, Yttria, Ceria, Carbides and Nitrides. Organic aerogels can be based on compounds including but are not limited to: urethanes, resorcinol formaldehydes, polyimide, polyacrylates, chitosan, polymethylmethacrylate, members of the acrylate family of oligomers, trialkoxysilyl terminated polydimethylsiloxane, polyoxyalkylene, polyurethane, polybutadiane, melamine-formaldehyde, phenol-furfural, a member of the polyether family of materials or combinations thereof. Examples of organic-inorganic hybrid aerogels include, but are not limited to: silica-PMMA, silica-chitosan, silica-polyether or possibly a combination of the aforementioned organic and inorganic compounds. Published US patent applications 2005/0192367 and 2005/0192366 teach extensively of such hybrid organic-inorganic materials and are hereby incorporated by reference in their entirety.

In embodiments of the present invention, smoke suppressing fillers (herein referred to as "fillers") comprise: phosphates, borates, metal silicates, metallocenes, molybdates, stannates, hydroxides, carbonates, zinc oxides, aluminum oxides, antimony oxides, magnesium-zinc blends, magnesium-zinc-antimony blends, or a combination thereof. At least some of the preceding fillers may be used in a hydrated form. In one embodiment, at least one of the fillers functions both as a smoke suppressant and flame retardant.

Phosphate fillers of the present invention include but are not limited to cyclic phosphates, alkylphosphates, ammonium polyphosphates, arylphosphates and alkarylphosphates. The alkyl phosphates useful for smoke suppressing fillers may contain from 2 to about 16 carbon atoms in the alkyl moieties, and more desirably from about 2 to 6. Examples of such alkyl phosphates include triethyl phosphate, tributyl phosphate, trihexyl phosphate, tridecyl phosphate, tri(2-ethylhexyl) phosphate, trioctyl phosphate, hexyldioctyl phosphate, and the like.

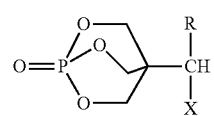

Formula 1

Preferred bicyclic phosphates in accordance with this invention are compounds of formula 1 where:
X=OH, OR', OC(O)R' or OC(O)NC$_3$Si(OEt)$_3$;
R=H, a saturated or unsaturated straight-chain or branched-chain $C_1$-$C_{17}$ alkyl, most preferably $C_1$-$C_3$; and
R' is a saturated or unsaturated $C_1$-$C_{17}$ alkyl, most preferably $C_1$-$C_3$.

Exemplary preferred bicyclic compounds are 2,6,7-trioxa-phosphobicyclo[2.2.2]-octane-4-methanol-1-oxide, and 2,6,7-trioxa-1-phosphobicyclo[2.2.2]-octane-4-methanol, acetate, 1-oxide. The most preferred bicyclic phosphates comprise an alkoxysilyl moiety (e.g. triethoxysilyl), particularly where the intended gel product is silica-based. Known methods in the art may be used to graft such moieties onto bicyclic phosphate compounds. One non-limiting route includes reaction of a hydroxyl group on the bicyclic phosphate with an isocyanatoalkylalkoxysilane compound (e.g. isocyanatopropyltriethoxysilane). The bicyclic phosphate may be employed at substantially any level to assist in smoke suppression. Desirably, bicyclic phosphates are present at a level of about 1 to 30 percent, preferably about 5 to 25 percent, and most preferably about 10 to 20 percent, all by weight of the final composition. U.S. Pat. No. 5,346,938 also describes similar uses for bicyclophosphates and is hereby incorporated by reference.

In another embodiment the fillers comprise a borate. The class of Borates (including metal Borates) comprises a whole host of compounds with smoke suppressing properties. Exemplary borates may comprise Magnesium, Sodium, Calcium, Zinc, Tantalum, Nickel, Titanium, Cerium, Potassium, Beryllium, Lithium, Antimony, Aluminum, Manganese, Copper, Strontium Iron and ammonia. Examples of borate minerals include Admontite (Hydrated Magnesium Borate), Aksaite (Hydrated Magnesium Borate Hydroxide), Ameghinite (Sodium Borate Hydroxide), Ammonioborite (Hydrated Ammonia Borate), Aristarainite (Hydrated Sodium Magnesium Borate), Bandylite (Copper Hydroborate Chloride), Behierite (Tantalum Niobium Borate), Berborite (Hydrated Beryllium Borate Hydroxide Fluoride), Biringuccite (Hydrated Sodium Borate Hydroxide), Blatterite (Manganese Magnesium Antimony Iron Borate Oxide), Boracite (Magnesium Borate Chloride), Borax (Hydrated Sodium Borate), Braitschite (Hydrated Calcium Sodium Cerium Lanthanum Borate), Calciborite (Calcium Borate), Chambersite (Manganese Borate Chloride), Chelkarite (Hydrated Calcium Magnesium Borate Chloride), Clinokurchatovite (Calcium Magnesium Iron Manganese Borate), Colemanite (Hydrated Calcium Borate Hydroxide), Congolite (Iron Magnesium Manganese Borate Chloride), Diomignite (Lithium Borate), Ekaterinite (Hydrated Calcium Borate Chloride Hydroxide), Ericaite (Iron Magnesium Manganese Borate Chloride), Ezcurrite (Hydrated Sodium Borate), Fabianite (Calcium Borate Hydroxide), Federovskite (Calcium Magnesium Manganese Borate Hydroxide), Fluoborite (Magnesium Borate Fluoride Hydroxide), Frolovite (Calcium Hydroborate), Ginorite (Hydrated Calcium Borate), Gowerite (Hydrated Calcium Borate), Halurgite (Hydrated Magnesium Borate Hydroxide), Hambergite (Beryllium Borate Hydroxide), Henmilite (Calcium Copper Hydroborate Hydroxide), Hexahydroborite (Hydrated Calcium Hydroborate), Hilgardite (Hydrated Calcium Borate Chloride), Howlite (Calcium Borate Silicate Hydroxide), Hulsite (Iron Magnesium Antimony Borate), Hungchaoite (Hydrated Magnesium Borate Hydroxide), Hydroboracite (Hydrated Calcium Magnesium Borate Hydroxide), Hydrochlorborite (Hydrated Calcium Borate Chloride Hydroxide), Inderborite (Hydrated Calcium Magnesium Borate Hydroxide), Inderite (Hydrated Magnesium Borate Hydroxide), Inyoite (Hydrated Calcium Borate Hydroxide), Jeremejevite (Aluminum Borate Fluoride Hydroxide), Jimboite (Manganese Borate), Johachidolite (Calcium Aluminum Borate), Kaliborite (Hydrated Potassium Magnesium Borate Hydroxide), Karlite (Magnesium Aluminum Borate Hydroxide Chloride), Kernite (Hydrated Sodium Borate), Korzhinskite (Hydrated Calcium Borate), Kotoite (Magnesium Borate), Kurchatovite (Calcium Magnesium Manganese Iron Borate), Kurnakovite (Hydrated Magnesium Borate Hydroxide), Larderellite (Ammonia Borate Hydroxide), Ludwigite Group (Magnesium Iron Nickel Titanium Antimony Aluminum Borate), Magnesiohulsite (Magnesium Iron Antimony Borate), Mcallisterite (Hydrated Magnesium Borate Hydroxide), Meyerhofferite (Hydrated Calcium Borate Hydroxide), Nasinite (Hydrated Sodium Borate Hydroxide), Nifontovite (Hydrated Calcium Borate Hydroxide), Nobleite (Hydrated Calcium Borate Hydroxide), Nordenskioldine (Calcium Antimony Borate), Olshanskyite (Calcium Hydroborate), Orthopinakiolite (Magnesium Manganese Borate), Penobsquisite (Hydrated Calcium Iron Borate Hydroxide Chloride), Pentahydroborite (Hydrated Calcium Hydroborate), Peprossiite (Cerium Lanthanum Aluminum Borate), Pinakiolite (Magnesium Manganese Antimony Borate), Pinnoite (Hydrated Magnesium Borate), Preobrazhenskite (Magnesium Borate Hydroxide), Priceite (Calcium Borate Hydroxide), Pringleite (Hydrated Calcium Borate Hydroxide Chloride), Probertite (Hydrated Sodium Calcium Borate Hydroxide), Rhodizite (Potassium Cesium Beryllium Aluminum Borate), Rivadavite (Hydrated Sodium Magnesium Borate), Roweite (Calcium Manganese Borate Hydroxide), Ruitenbergite (Hydrated Calcium Borate Hydroxide Chloride), Santite (Hydrated Potassium Borate Hydroxide), Sassolite (Boric Acid), Satimolite (Hydrated Potassium Sodium Aluminum Chloride), Sborgite (Hydrated Sodium Borate Hydroxide), Shabynite (Hydrated Magnesium Borate Chloride Hydroxide), Sibirskite (Calcium Borate Hydroxide), Sinhalite (Magnesium Aluminum Borate), Solongoite (Calcium Borate Hydroxide Chloride), Strontioborite (Strontium Borate Hydroxide), Strontiogi-norite (Hydrated Strontium Calcium Borate), Studenitsite (Hydrated Sodium Calcium Borate Hydroxide), Suanite (Magnesium Borate), Sussexite (Magnesium Borate Hydroxide), Szaibelyite (Magnesium Borate Hydroxide), Takedaite (Calcium Borate), Takeuchiite (Magnesium Manganese Iron Borate), Teepleite (Sodium Hydroborate Chloride), Tertschite (Hydrated Calcium Borate), Tincalconite (Hydrated Sodium Borate), Trembathite (Magnesium Iron Borate Chloride), Tunellite (Hydrated Strontium Borate Hydroxide), Tusionite (Manganese Antimony Borate), Tuzlaite (Hydrated Sodium Calcium Borate Hydroxide), Tyretskite (Hydrated Calcium Borate Hydroxide), Ulexite (Hydrated Sodium Calcium Borate), Uralborite (Calcium Borate Hydroxide), Veatchite (Hydrated Strontium Borate Hydroxide), Vimsite (Calcium Borate Hydroxide), Volkovskite (Hydrated Potassium Calcium Borate Hydroborate Chloride), Wardsmithite (Hydrated Calcium Magnesium Borate), Warwickite (Magnesium Titanium Iron Aluminum Borate Oxide), Wightmanite (Hydrated Magnesium Borate Oxide Hydroxide) and Yuanfulite (Magnesium Iron Aluminum Titanium Borate Oxide).

A general formula representing such Borates is: $(A)_w(J)_x(Z)_yBO_3$

Where A=Ammonia, Water, Hydrogen or a combination thereof

J=at least one of Magnesium, Sodium, Calcium, Tantalum, Cerium, Potassium, Beryllium, Lithium, Antimony, Aluminum or Strontium Z=at least one of Manganese, Iron, Copper, Nickel, Titanium and Zinc Where y+x is greater than or equal to 1 (i.e. x=0, 1, 2, . . . ; y=0, 1, 2, . . . ) and w is greater than or equal to zero (i.e. w=0, 1, 2, . . . )

Borate filler compounds of the present invention preferably comprise at least one transition metal. The most preferred borates for use in the present invention are Zinc Borates and variations thereof. One particularly preferred form is hydrated Zinc Borates. The known hydrated zinc borates include $ZnOB_2 O_3 \cdot H_2O$, $2ZnO \cdot 3B_2 O_3 \cdot 5H_2O$, $2ZnO \cdot 3B_2 O_3 \cdot 7H_2O$, $3ZnO \cdot 5B_2 O_3 \cdot 14H_2O$ (sometimes designated $2ZnO \cdot 3B_2 O_3 \cdot 9H_2O$), $ZnO \cdot B_2 O_3 \cdot 2H_2O$, $ZnO \cdot 5B_2 O_3 \cdot 5H_2O$, $2 ZnO \cdot 3B_2 O_3 \cdot 3H_2O$, and $6ZnO \cdot 5B_2 O_3 \cdot 3H_2O$. U.S. Pat. Nos. 3,649,172; 4,246,246 and 5,472,644 also teach of Zinc Borates and hydrated forms thereof, all of which are hereby incorporated by reference. The borate fillers are incorporated in the aerogel at levels of from about 1 to 40 percent by weight of the final aerogel composite. Preferably, between about 2 to 20 percent is used.

The Borate fillers suitable for use are preferably such that their largest dimensions are less than about 100 µm, less than about 50 µm, less than about 10 µm or less than about 5 µm. If substantially spherical, the "largest dimension" of a filler particle refers to its diameter whereas if rod or cone-shaped, a particles length is referenced. Alternatively, dimensions of the borate fillers are such that the fillers readily disperse in a sol solution and do not prevent gel formation therein. Preferably, the aerogels (or aerogel composites) of the present invention comprise less than about 50%, less than about 30%, less than about 20%, less than about 10% or less than about 5% by weight of Borate fillers.

In another embodiment, metal silicate fillers are used which comprise at least one alkali earth metal such as Beryllium, Magnesium, Calcium, Strontium, Barium and Radium. Preferably, the filler comprises Calcium. Furthermore the fillers may also comprise other non-alkali earth metals such as Aluminum, Iron, Titanium, Manganese, Potassium and Sodium in addition to the alkali earth metals. It is to be noted that some water-based gel preparation techniques, such as the water glass process, utilize metal (e.g. sodium) silicates, but only as a silica source. This leads to a final dried gel which is essentially free of metal silicates per se.

A general formula for representing suitable metal silicates is: $(Q)_x(M)_y SiO_3$ Where M=an alkali earth metal (Beryllium, Magnesium, Calcium, Strontium, Barium and Radium)
Q=a non-alkali earth metal (Aluminum, Iron, Titanium, Manganese, Potassium and Sodium)
y=the number of different alkali earth metals and is ≥1 (i.e. 1, 2, 3, . . . )
x=the number of different non-alkali earth metals, and is ≥0 (i.e. 0, 1, 2, . . . )

In mineral form, the metal silicate fillers may be structurally grouped into Nesosilicates, Sorosilicates, Inosilicates Cyclosilicates, Phyllosilicates or Tectosilicates. Specific examples of silicate minerals include: Chloritoid (Iron Magnesium Manganese Aluminum Silicate Hydroxide), Datolite (Calcium Boro-Silicate Hydroxide), Euclase (Beryllium Aluminum Silicate Hydroxide), Fosterite (Magnesium Silicate), Gadolinite (Yttrium Iron Beryllium Silicate), Andradite (Calcium Iron Silicate), Grossular (Calcium Aluminum Silicate), Pyrope (Magnesium Aluminum Silicate), Spessartine (Manganese Aluminum Silicate), Uvarovite (Calcium Chromium Silicate), Howlite (Calcium Boro-Silicate Hydroxide), Humite (Magnesium Iron Silicate Fluoride Hydroxide), Olivine (Magnesium Iron Silicate), Phenakite (Berylium Silicate), Sphene or Titanite (Calcium Titanium Silicate), Staurolite (Iron Magnesium Zinc Aluminum Silicate Hydroxide), Topaz (Aluminum Silicate Fluoride Hydroxide), Uranophane (Hydrated Calcium Uranyl Silicate), Bertrandite (Beryllium Silicate Hydroxide), Danburite (Calcium Boro-Silicate), Allanite (Yttrium Cerium Calcium Aluminum Iron Silicate Hydroxide), Clinozoisite (Calcium Aluminum Silicate Hydroxide), Epidote (Calcium Iron Aluminum Silicate Hydroxide), Zoisite (Calcium Aluminum Silicate Hydroxide), Ilvaite (Calcium Iron Silicate Hydroxide), Idocrase or Vesuvianite (Calcium Magnesium Aluminum Silicate Hydroxide),Okenite (Hydrated Calcium Silicate), Pectolite (Sodium Calcium Silicate Hydroxide), Aegirine (Sodium Iron Silicate), Augite (Calcium Sodium Magnesium Aluminum Iron Titanium Silicate), Diopside (Calcium Magnesium Silicate), Enstatite (Magnesium Silicate), Hedenbergite (Calcium Iron Silicate), Hypersthene (Magnesium Iron Silicate), Rhodonite (Manganese Iron Magnesium Calcium Silicate), Serandite (Sodium Manganese Calcium Silicate Hydroxide), Wollastonite (Calcium Silicate), Actinolite (Calcium Magnesium Iron Silicate Hydroxide), Anthophyllite (Magnesium Iron Silicate Hydroxide), Cummingtonite (Iron Magnesium Silicate Hydroxide), Edenite (Sodium Calcium Magnesium Iron Aluminum Silicate Hydroxide), Hornblende (Calcium Sodium Magnesium Iron Aluminum Silicate Hydroxide), Tremolite (Calcium Magnesium Iron Silicate Hydroxide), Babingtonite (Calcium Iron Manganese Silicate Hydroxide), Inesite (Hydrated Calcium Manganese Silicate Hydroxide), Axinite (Calcium Magnesium Iron Manganese Aluminum Borosilicate Hydroxide), Baratovite (Potassium Lithium Calcium Titanium Zirconium Silicate Fluoride), Benitoite (Barium Titanium Silicate), Beryl (Berylium Aluminum Silicate), Cordierite (Magnesium Aluminum Silicate), Eudialyte (Sodium Calcium Cesium Iron Manganese Zirconium Silicate Hydroxide Chloride), Milarite (Hydrated Potassium Calcium Aluminum Beryllium Silicate), Osumilite (Potassium Sodium Iron Magnesium Aluminum Silicate), Dravite (Sodium Magnesium Aluminum Boro-Silicate Hydroxide), Uvite (Calcium Sodium Iron Magnesium Aluminum Boro-Silicate Hydroxide), Apophyllite (Hydrated Potassium Sodium Calcium Silicate Hydroxide Fluoride), Cavansite (Hydrated Calcium Vanadium Silicate), Chlorite (Iron Magnesium Aluminum Silicate Hydroxide), Clinochlore (Iron Magnesium Aluminum Silicate Hydroxide), Talc (Magnesium Silicate Hydroxide), Gyrolite (Hydrated Calcium Silicate hydroxide), Biotite (Potassium Iron Magnesium Aluminum Silicate Hydroxide Fluoride), Phlogopite (Potassium Magnesium Aluminum Silicate Hydroxide Fluoride), Prehnite (Calcium Aluminum Silicate Hydroxide), Serpentine (Iron Magnesium Silicate Hydroxide), Albite (Sodium Aluminum Silicate), Andesine (Sodium Calcium Aluminum Silicate), Anorthite (Calcium Aluminum Silicate), Bytownite (Calcium Sodium Aluminum Silicate), Labradorite (Sodium Calcium Aluminum Silicate), Oligoclase (Sodium Calcium Silicate), Cancrinite (Sodium Calcium Aluminum Silicate Carbonate), Lazurite (Sodium Calcium Aluminum Silicate Sulfate Sulfide Chloride), The Quartz Group: (All Silicon Dioxide), Scapolite (Calcium Sodium Aluminum Silicate Chloride Carbonate Sulfate), Chabazite (Hydrated Calcium Aluminum Silicate), Harmotome (Hydrated Barium Potassium Aluminum Silicate), Heulandite (Hydrated Sodium Calcium Aluminum Silicate), Laumontite (Hydrated Calcium Aluminum Silicate), Mesolite (Hydrated Sodium Calcium Aluminum Silicate), Phillipsite (Hydrated Potassium Sodium Calcium Aluminum Silicate), Scolecite (Hydrated Calcium Aluminum Silicate), Stellerite (Hydrated Calcium Aluminum Silicate), Stilbite (Hydrated Sodium Calcium Aluminum Silicate) and Thomsonite (Hydrated Sodium Calcium Aluminum Silicate). The most preferred silicate is Wollastonite and its derivatives. U.S. Pat. No. 6,433,049 further discusses Wollastonite and is hereby incorporated by reference.

Inosilicates, especially when comprising calcium, are particularly preferred although other metal silicates discussed herein are viable alternatives. Examples of single chain calcium-containing Ino silicates include: Okenite (Hydrated Calcium Silicate), Pectolite (Sodium Calcium Silicate Hydroxide), Augite (Calcium Sodium Magnesium Aluminum Iron Titanium Silicate), Diopside (Calcium Magnesium Silicate), Hedenbergite (Calcium Iron Silicate), Rhodonite (Manganese Iron Magnesium Calcium Silicate), Serandite (Sodium Manganese Calcium Silicate Hydroxide) and Wollastonite (Calcium Silicate.)

The metal silicate fillers suitable for use are preferably such that their largest dimensions are less than about 100 µm, less than about 50 µm, less than about 10 µm or less than about 5 µm. If substantially spherical, the "largest dimension" of a filler particle refers to its diameter whereas if rod or cone-shaped, a particles length is referenced. Alternatively, dimensions of the silicate fillers are such that the fillers readily disperse in a sol solution and do not prevent gel formation therein. Preferably, the aerogels (or aerogel composites) of the present invention comprise less than about 50%, less than about 30%, less than about 20%, less than about 10% or less than about 5% by weight of metal silicate fillers.

In another embodiment the fillers comprise at least one metallocene. Metallocenes are formed by the combination of ionic cyclopentadiene, a reactive but aromatic organic anion, with transition metals or metal halides. A general structure for metallocenes is represented by formula 2 where M comprises a metal such as, but limited to: Chromium, Cobalt, Hafnium, Iron, Titanium, Vanadium, Ruthenium, Rhodium, Zirconium, Tungsten, Molybdenum, Osmium, or Nickel. These compounds are usually stable at high temperatures and can contribute to smoke suppression and/or flame retardation.

Formula 2

Ferrocenes (M=Iron) are the preferred metallocenes for use in embodiments of the present invention. Typically ferrocenes having molecular weights greater than about 200 may be used. Other suitable ferrocene derivatives, are those having a molecular weight of at least 360 and include both simple high molecular weight ferrocene derivatives such as, but not limited to, monoalkyl and dialkyl substituted ferrocenes, for example, butyldecyl ferrocene, hexadecyl ferrocene, bis-(heptylcyclopentadienyl)-iron, monoalkanoyl and dialkanoyl substituted ferrocenes, for example, lauroyl ferrocene, and also dimers and polymers such as, for example, vinyl ferrocene copolymers with vinyl chloride or acrylic acid methyl methacrylate, or butadiene or cyclopentane; ferrocene condensation dimers and polymers with aldehydes and ketones; ferrocene addition products with polyvinyl chloride and polyvinylidene chloride; and the like. The high molecular weight ferrocene derivatives are known compounds and can be prepared according to known procedures such as, for example, described in U.S. Pat. Nos. 3,238,185; 3,341,495; 3,350,369; 3,437,634; 3,673,232; 3,770,787 or by any appropriate modifications thereof. For example, ferrocene polymers having the general formula 3 can be used wherein: m is an integer greater than 2 (i.e. 2, 3, 4, . . . ), and in some cases 50 and above; and

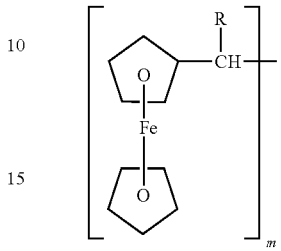

Formula 3

R is hydrogen, low molecular weight alkyl groups, aryl or alkylaryl, (e.g. phenyl, methyl, phenyl, alkylphenyl, etc.) The cyclopentadienyl rings of the ferrocenyl group may be substituted by alkyl groups, aryl, aralkyl, alkaryl, or halogen. One or more of such groups may be present as substituents on one or both of the cyclopentadienyl rings.

The metallocene fillers suitable for use are preferably such that their largest dimensions are less than about 100 µm, less than about 50 µm, less than about 10 µm or less than about 5 µm. If substantially spherical, the "largest dimension" of a filler particle refers to its diameter whereas if rod or cone-shaped, a particles length is referenced. Alternatively, dimensions of the metallocene fillers are such that the fillers readily disperse in a sol solution and do not prevent gel formation therein. Preferably, the aerogels (or aerogel composites) of the present invention comprise less than about 50%, less than about 30%, less than about 20%, less than about 10% or less than about 5% by weight of metallocene fillers.

In one embodiment, the fillers comprise molybdates and derivatives thereof. Molybdates are minerals with a $MoO_4^-$ ion and at least one metal exemplified by, but no limited to Wulfenite ($PbMoO_4$). Examples of suitable molybdates for use in the present invention include but are not limited to: $MoS_2$, $MoO_3$, $CaMoO_4$, $Mo_2O_5$, $MoS_3$, $Mo_2S_3$, $Mo_2O_3$, $MoO_2$, $MoS_4$, $MoCl_3$, $MoBr_3$, $PbMoO_4$, ammonium 5-molybdocobaltate (III), 9-molybdonickelate (IV), 6-molybdoaluminate (III), 6-molybdochromate (III), ammonium dimolybdate, ammonium molybdate, ammonium heptamolybdate, ammonium octamolybdate, ammonium phosphomolybdates, alkali metal molybdates, and alkaline earth molybdates.

The molybdate fillers suitable for use are preferably such that their largest dimensions are less than about 100 µm, less than about 50 µm, less than about 10 µm or less than about 5 µm. If substantially spherical, the "largest dimension" of a filler particle refers to its diameter whereas if rod or cone-shaped, a particles length is referenced. Alternatively, dimensions of the borate fillers are such that the fillers readily disperse in a sol solution and do not prevent gel formation therein. Preferably, the aerogels (or aerogel composites) of the present invention comprise less than about 50%, less than about 30%, less than about 20%, less than about 10% or less than about 5% by weight of molybdate fillers. U.S. Pat. Nos. 4,680,334 and 4,762,700 further describe molybdates and are hereby incorporated by reference.

In another embodiment the fillers comprise antimony. The antimony constituent of the flame retardant and/or smoke suppressing composition can be any suitable antimony compound dispersible in finely divided form in the solution comprising gel precursors. Exemplary antimony compounds are antimony trioxide, antimony tetraoxide, antimony pentaoxide, antimony silico-oxide, and other inorganic compounds of antimony, such as antimony sulfides including antimony tribromide, antimony tetrachloride, antimony trioxide, and the like. U.S. Pat. No. 4,859,365 also describes such compounds and the corresponding use. AmericaUSIn another embodiment, the fillers comprise a metal oxide such as but not limited to zinc oxide, aluminum oxide, antimony oxide, hydrates and derivatives thereof. The iron oxides which can be used $Fe_2O_3$, $Fe_3O_4$, FeO, yellow iron oxide, red iron oxide, derivatives and hydrates thereof. These oxides when used should be finely divided so as to insure substantially uniform dispersal of the same throughout the gel precursor solution. Hydrated alumina is a composition generally indicated by the formula $Al_2O_3$:3 $H_2O$ or $Al(OH)_3$. Thus, on a weight basis hydrated alumina contains about 65 percent aluminum oxide and about 35 percent water. Commercially available grades of hydrated alumina can be employed in the practice of the present invention, such as hydrated alumina C-230 sold by Alcoa Chemical Division of Aluminum Company of. In still further embodiments, magnesium-zinc blends such as magnesium-zinc-antimony are used. Example of a suitable Antimony Oxide is commercially available under Montana Brand "Low Tint" Antimony Oxide produced by United States Antimony Corporation. This product is a mixture of senarmontite, and typically more than 3% valentinite with an average particle size of 1.8 to 3.0 microns.

AmericaUSIn embodiments of the present invention, any of the aforementioned fillers may be used in hydrated form (i.e. comprising at least one water molecule.) Hydrates are useful for flame retarding as well as smoke suppression. U.S. Pat. No. 5,378,753 hereby incorporate by reference describes aluminum oxide hydrates $Al_2O_3$:x $H_2O$ (where x=1, 2, 3, . . . ). In a similar fashion other metal oxide hydrates can be employed.

In another embodiment the metal oxide fillers are incorporated into the aerogel material further comprise halogenated compounds such as chlorides and bromides. Suitably, 2 parts halogenated compound to metal oxides are used, more preferably three to four parts. For example, antimony oxide may be combined in a 1:4 stoichoemetric ratio with antimony tri chloride for added fire retarding capability.

In an embodiment, the fillers are coated or chemically treated for enhanced miscibility, smoke suppression, fire retardation, antioxidation or general stability. This surface modification can allow for better dispersion in the precursor solution, better compatibility with the sol-gel process in addition to other benefits.

In the preferred embodiments of the present invention, silica aerogels are discussed whereas the invention as a whole may be practiced with other aerogel compositions as well. The following examples utilize the sol-gel process for preparing gel materials wherein drying of wet-gels derived from this process yields aerogels. The sol-gel process is described in detail in Brinker C. J., and Scherer G. W., *Sol-Gel Science*; New York: Academic Press, 1990; hereby incorporated by reference. Fillers as used in the examples below may be chosen from any one, or a combination of the aforementioned fillers.

One mode of practicing embodiments of the present invention comprises the steps of:

(a) Forming a gel from a mixture comprising gel precursors and fillers; and
(b) drying the gel.

Another mode of practice comprises the steps of:
(c) dispensing an amount of fillers into a gel precursor solution, thereby forming a mixture;
(d) forming a gel from said mixture; and
(e) drying the gel.

Yet another mode of practice comprises the steps of:
(a) mixing an amount of a filler with an amount of gel precursor in a suitable solvent;
(b) forming a gel from the mixture; and
(c) drying the gel.

In general, the gel precursors of step (a) comprise metal oxides that are compatible with the sol-gel process where upon polymerization form a gel network(s). The silica precursors used may be chosen from but are not limited to: alkoxysilanes, partially hydrolyzed alkoxysilanes, tetraethoxylsilane (TEOS), partially hydrolyzed TEOS, condensed polymers of TEOS, tetramethoxysilane (TMOS), partially hydrolyzed TMOS, condensed polymers of TMOS, tetra-n-propoxysilane, partially hydrolyzed and/or condensed polymers of tetra-n-propoxysilane, or combinations thereof. TEOS, partially hydrolyzed polyethysilicates, and polyethylsilicates are some of the more common commercially available silica precursors. The fillers may be dispensed in the gel precursor solution at any point before a gel is formed. Gel formation may be viewed as the point where a solution (or mixture) exhibits resistance to flow and/or forms a continuous polymeric network throughout its volume. Preferably the mixture comprising fillers and precursors is a homogenous solution, conducive to gel formation.

Suitable solvents for use herein include: lower alcohols with 1 to 6 carbon atoms, preferably 2 to 4, although other solvents can be used as is known in the art. Ethanol, is typically most favored. Examples of other useful solvents include but are not limited to: ethyl acetate, ethyl acetoacetate, acetone, dichloromethane, tetrahydrofuran and the like. Of course in order to achieve a desired level of dispersion or solution certain gel precursor/filler systems, a multi-solvent approach may be required.

Generally, gels may be formed via maintaining the mixture in a quiescent state for a sufficient period of time, changing the pH of the solution, directing a form of energy onto the mixture, or a combination thereof. Exemplary forms of energy include: a controlled flux of electromagnetic (ultraviolet, visible, infrared, microwave), acoustic (ultrasound), or particle radiation.

Gels may be additionally aged prior to drying to further strengthen the gel structure by increasing the number of cross-linkages. This procedure is useful for preventing potential volume loss during drying, or simply a stronger final gel. Aging can involve: maintaining the gel (prior to drying) at a quiescent state for an extended period, maintaining the gel at elevated temperatures, addition of cross-linkage promoting compounds or any combination thereof. Aging time period typically requires between about 1 hr and several days. The preferred temperatures are usually between about 10° C. and about 100° C.

Drying plays an important role in engineering the properties of aerogels, such as porosity and density which influence the material thermal conductivity. To date, numerous drying methods have been explored. U.S. Pat. No. 6,670,402 teaches drying via rapid solvent exchange of solvent(s) inside wet gels using supercritical $CO_2$ by injecting supercritical, rather than liquid, $CO_2$ into an extractor that has been pre-heated and pre-pressurized to substantially supercritical conditions or above to produce aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically drying the fluid/sol-gel. U.S. Pat. No. 6,315,971 discloses processes for producing gel compositions comprising: drying a wet gel comprising gel solids and a drying agent to remove the drying agent under drying conditions sufficient to minimize shrinkage of the gel during drying. Also, U.S. Pat. No. 5,420,168 describes a process whereby Resorcinol/Formaldehyde aerogels can be manufactured using a simple air drying procedure. Finally, U.S. Pat. No. 5,565,142 herein incorporated by reference describes subcritical drying techniques. The embodiments of the present invention can be practiced with drying using any of the above techniques. In some embodiments, it is preferred that the drying is performed at vacuum to below super-critical pressures (pressures below the critical pressure of the fluid present in the gel at some point) and optionally using surface modifying agents.

Fiber-reinforced aerogels as previously described may be prepared with fillers according to the present invention to obtain conformable aerogel composites with reduced smoke emission. Optionally, at least some of the fillers also provide flame retardancy. This can be accomplished by dispensing chopped fibers, a fibrous structure or both into a mixture (solution) comprising gel precursors and fillers. Suitable fibrous structures include, but are not limited to wovens, non-wovens, mats, felts, battings (e.g. lofty batting) and combinations thereof. Alternatively, said mixture may be transferred into a fibrous structure, with or without chopped fibers. Of course in either case, the fibrous structure may be completely or incompletely submerged in the solution comprising the precursors. In all such cases, gel formation followed by drying results in fiber-reinforced aerogel composites. Aerogel composites reinforced with a fibrous batting, herein referred to as "blankets", are particularly useful for applications requiring flexibility since they are highly conformable and provide excellent thermal conductivity. Aerogel blankets and similar fiber-reinforced aerogel composites are described in published US patent application 2002/0094426A1 and U.S. Pat. Nos. 6,068,882; 5,789,075; 5,306,555; 6,887,563 and 6,080,475 all hereby incorporated by reference, in their entirety.

Accordingly, a mode of preparing fiber-reinforced aerogel composites comprises the steps of:
(a) dispensing a mixture comprising fillers and gel precursors, into a fibrous structure;
(b) forming a gel from said mixture; and
(c) drying the gel.
Another method comprises the steps of:
(a) dispensing an amount of fillers into a gel precursor solution, thereby forming a mixture;
(b) introducing a fibrous structure into said mixture;
(c) forming a gel from said mixture; and
(d) drying the gel.
Another method comprises the steps of:
(a) dispensing an amount of fillers into a gel precursor solution, thereby forming a mixture;
(b) introducing the mixture into a fibrous structure;
(c) forming a gel from said mixture; and
(d) drying the gel.
Yet another method comprises the steps of:
(a) dispensing a gel precursor solution into a fibrous structure;
(b) dispensing an amount of fillers into the gel precursor solution;
(c) forming a gel from said solution; and
(d) drying the gel.
Still, another method comprises the steps of:
(a) dispensing an amount of fillers into a fibrous structure;
(b) introducing a gel precursor solution into said fibrous structure;
(c) forming a gel from said solution; and
(d) drying the gel.

In an embodiment, any of the ingredients, fillers or other materials described in the present patent application may be used in any part of a final system. In other words, they may be designed to be outside the aerogel material, as part of the aerogel material, as part of the aerogel composite, as part of the fiber reinforcement or any other possibilities thereof. Alternatively, fibers comprising one or more of the ingredients or fillers may be used. They may be preferred in some instances as one need not add a specific ingredient separately.

In another embodiment, the fibers are chosen such that the organic content of the fibers in minimal. Alternatively, organic content is reduced in the fibers by processes such as pyrolysis where the organic content is converted into carbon. Any binders present in the fibers are avoided and reduced in amount to reduce the overall organic content.

In another embodiment, the organic content of the aerogel composite is reduced and preferably considerably reduced. Additionally, various fillers and ingredients described in the present patent application are used to reduce the combustibility of the resulting composites.

In an embodiment, the composition of the product comprises a magnesium hydroxide or a derivative or analog thereof, from 0.1 wt % to 50 wt % of the aerogel matrix and preferably from 15 wt % to 50 wt % of the aerogel matrix. Without being bound by a specific theory or mechanism, in an embodiment, Magnesium hydroxide, also commonly referred to as magnesium dihydroxide or MDH, may serve as a flame retardant on a number of levels. Flame retardants can function to reduce flammability in 5 different ways: (1) physical dilution, (2) gas dilution, (3) thermal quenching, (4) formation of protective coatings or barrier layers, (5) chemical interaction. Magnesium hydroxide in one instance reduces flammability via physical dilution by replacing a portion of flammable polymer fibers, carbon fibers, surface modified silica, or other surface modified metal oxides. Magnesium hydroxide in an instant reduces flammability via gas dilution based on its release of water during thermal decomposition. This water generation helps to exclude oxygen and dilute the concentration of flammable gases during combustion. Magnesium hydroxide in an instant reduces flammability via thermal quenching due to its endothermic decomposition that absorbs heat from the system and may prevent or prolong the onset of ignition and will retard the combustion of flammable materials. In addition, magnesium hydroxide may contribute to char formation in organic materials and the formation of magnesium oxide upon decomposition may aid in smoke suppression and promote the formation of a barrier layer that limits flammability.

In an embodiment, the composition of the product comprises an aluminum hydroxide or a derivative or analog thereof, from 0.1 wt % to 50 wt % of the aerogel matrix and preferably from 15 wt % to 50 wt % of the aerogel matrix. Aluminum hydroxide, also commonly referred to as alumina trihydrate or ATH, can serve as a flame retardant on a number of levels. Without being bound by a specific theory or mechanism, in an embodiment, Aluminum hydroxide reduces flammability via physical dilution by replacing a portion of flammable polymer fibers, carbon fibers, surface modified silica, or other surface modified metal oxides. Aluminum hydroxide in another instant reduces flammability via gas dilution based on its release of water during thermal decomposition. This water generation helps to exclude oxygen and dilute the concentration of flammable gases during combustion. Aluminum hydroxide in another instant reduces flammability via thermal quenching due to its endothermic decomposition that absorbs heat from the system and may prevent or prolong the onset of ignition and will retard the combustion of flammable materials. In addition, aluminum hydroxide may contribute to char formation in organic materials and the formation of aluminum oxide upon decomposition may aid in smoke suppression and promote the formation of a barrier layer that limits flammability.

In an embodiment, the composition of the product comprises Zinc borate or a derivative or analog thereof, from 0.1 wt % to 50 wt % of the aerogel matrix and preferably, from 3 wt % to 20 wt % of the aerogel matrix. Zinc borate, formally dodecaboron tetrazinc docosaoxide heptahydrate and related compounds such as diboron tetrazinc heptaoxide hydrate and hexaboron tetrazinc decaoxide, can serve as a flame retardant on a number of levels. Without being bound by a specific theory or mechanism, in an embodiment, Zinc borate in an instant reduces flammability via physical dilution by replacing a portion of flammable polymer fibers, carbon fibers, surface modified silica, or other surface modified metal oxides. Zinc borate hydroxide in another instant reduces flammability via gas dilution based by releasing water of hydration at elevated temperatures. This water generation helps to exclude oxygen and dilute the concentration of flammable gases during combustion. Zinc borate in yet another instant reduces flammability via formation of protective coatings or barrier layers. Zinc borate promotes char formation in a variety of organic systems. It also contributes to the formation of glassy or ceramic materials to serve as barrier layers and may act synergistically with ATH and MDH in flame and smoke suppression.

In an embodiment, the composition of the product comprises a calcium silicate or a derivative or analog thereof, including calcium meta silicate from 0.1 wt % to 50 wt % of the aerogel matrix and preferably from 2 wt % to 10 wt % of the aerogel matrix. Without being bound by a specific theory or mechanism, in an embodiment, Calcium silicate in an instant reduces flammability via physical dilution by replacing a portion of flammable polymer fibers, carbon fibers, surface modified silica, or other surface modified metal oxides. Calcium silicate in another instant reduces flammability via formation of protective coatings or barrier layers. Calcium silicate can contribute to char formation and enhance the mechanical properties of char layers in a variety of organic systems. It also contributes to the formation of glassy or ceramic materials to serve as barrier layers in a variety of inorganic systems and may act synergistically with inorganic flame retardants (ATH, MDH, etc.), boron compounds (boric acid, zinc borate, etc.), or the silica or other metal oxides of the aerogel matrix or flame or smoke suppressant systems.

In an embodiment, the composition of the product comprises a water absorbing or hygroscopic component in various percentages. Without being bound by a specific theory or mechanism, Such components would be helpful in reducing flammability or combustibility by releasing any bound water. A non-limiting examples of such components include montmorillonite, illite, bentonite, vermiculite, perlite, saponite and hectorite. Such materials may also be included in other components of any product such as fibers, which may be desirable in some instances.

In am embodiment, products may comprise zinc borate or a derivative or analog thereof, in 0-20% wt, silica or a derivative or analog thereof, in 0-75% wt, a calcium silicate or a derivative or analog thereof, in 0-15% wt, a magnesium hydroxide or a derivative or analog thereof, in 1-40% wt or aluminum hydroxide or a derivative or analog thereof (including alumina trihydrate) in 1-40% wt.

For optimal thermal insulation, aerogels can be further opacified to reduce the radiative component of heat transfer. At any point prior to gel formation, opacifying compounds may be dispersed into the mixture comprising gel precursors. Examples of opacifying compounds include and are not limited to: $B_4C$, Diatomite, Manganese ferrite, MnO, NiO, SnO, $Ag_2O$, $Bi_2O_3$, TiC, WC, carbon black, titanium oxide, iron titanium oxide, zirconium silicate, zirconium oxide, iron (I) oxide, iron (III) oxide, manganese dioxide, iron titanium oxide (ilmenite), chromium oxide, silicon carbide or mixtures thereof.

Aerogels may be surface treated to impart or improve hydrophobicity. The hydrophobic treatment is carried out by reacting a hydroxy moiety of a silanol group present on a surface of the wet-gel compound (silica gel) with a functional group of a hydrophobing agent thereby converting the silanol group into a hydrophobic group of the hydrophobicity-imparting (water repelleing) agent. For example, the hydrophobing treatment can be carried out by immersing a gel in a hydrophobicity-imparting solution of a hydrophobing agent in a solvent, and mixing the gel and the solution to allow the hydrophobicity-imparting agent to permeate the gel, while if necessary, heating such a gel mixture so that a hydrophobicity-imparting reaction occurs. Examples of the solvent for use in the hydrophobic treatment include methanol, ethanol, isopropanol, xylene, toluene, benzene, N,N-dimethylformamide, hexamethyldisiloxane and the like. There is no particular limit in selection of the solvent, in so far as the solvent can easily dissolve the hydrophobing agent and can replace the solvent contained in the gel before the hydrophobic treatment. Where the supercritical drying is carried out after the hydrophobic treatment, the solvent to be used in the hydrophobic treatment is preferably a medium that facilitates the supercritical drying (e.g., methanol, ethanol, isopropanol, liquefied carbon dioxide, gaseous carbon dioxide or the like), or a medium which can be replaced with the former medium. Examples of the hydrophobic agent include hexamethyldisilazane, hexamethyldisiloxane, trimethylmethoxysilane, dimethyldimethoxysilane, methyltrimethoxysilane, ethyltrimethoxysilane, trimethylethoxysilane, dimethyldiethoxysilane, methyltriethoxysilane and the like. Hydrophobic treatments are further described in U.S. Pat. No. 5,565,142 hereby incorporated by reference.

However, hydrophobic agents often comprise hydrocarbon components which yield smoke upon incomplete combustion or contribute to combustion or the heat of combustion. Likewise aging compounds useful for further strengthening the gel network may yield smoke or contribute to combustion if not fully removed from the gel structure. Therefore, in this case it is desirable to minimize the residual hydrocarbon components in the aerogel.

The Smoke Density Index (SDI) for aerogels and aerogel composites of the present invention may be estimated according to ASTM E84. Based on a previously tested sample(s) according to ASTM E84, an apparatus such as that of FIG. 1 can be set up to estimate SDI values for other samples. FIG. 1 represents an apparatus utilized for a pseudo-SDI calculation of various aerogel samples where the samples are placed on top of a crucible furnace 2 and subjected to a high radiant heat flux. The smoke generated from the samples is collected by a conical duct 4, and guided to a region penetrated by light from a light source 6 which is measured by a light meter 8. An external fan 10 assists in moving the smoke through the system. The smoke density of the samples would be estimated via light obstruction technique while exposed to 1000° C. for 15 minutes.

The following examples merely serve to assist in understanding certain aspects of the present invention and therefore may not be used to limit the scope thereof in any manner.

Example 1

Firebrake® a commercially available Zinc Borate available from Luzenac is used as filler. Firebrake® fillers are first dispersed in an ethanol and/or water medium. The mixture may be mixed and/or agitated as necessary to achieve a uniform dispersion of fillers in said medium. Mixing/agitation times typically require about 1 hr, although longer times may be needed to achieve a uniform dispersion. Said dispersion is combined with a solution comprising partially hydrolyzed ethylpolysilicates (gel precursors) wherein a gel is prepared therefrom. To assist the gel formation (polymerization) reaction, said mixture comprising the fillers and gel precursors further comprises a catalyst (e.g. ammonia as 5% v:v ammonia in ethanol). A gel is typically formed between 4 minutes and 14 hours depending if a gel promoting step (e.g., catalyst, heat, etc.) is employed. Of course gel times may lie outside of this range depending on the concentration of species, identity of the species (type of filler, precursor, etc.), type of medium, reaction conditions (temperature, pressure, etc.) or others. For preparing the corresponding fiber-reinforced aerogel composites, the mixture is combined with a lofty batting or a felt prior to gellation. The filler content used is between 1-50% wt relative to the final composite. The gel precursor concentration and volume of the mixture comprising the same are chosen based on the desired target density of the final gel. Once the gel is formed, it is treated with HMDZ and subjected to aging under basic conditions, and kept in a quiescent state. The gel is rinsed to remove water and base. Next the strengthened gel is placed in an autoclave and subjected to drying via supercritical $CO_2$.

Example 2

Ammoniumoctamolybdate commercially available from H. C. Starck is used as filler. Ammoniumoctamolybdate fillers and are first dispersed in an ethanol and/or water medium. The mixture may be mixed and/or agitated as necessary to achieve a uniform dispersion of fillers in said medium. Mixing/agitation times typically require about 1 hr, although longer times may be needed to achieve a uniform dispersion. Said dispersion is combined with a solution comprising partially hydrolyzed ethylpolysilicates (gel precursors) wherein a gel is prepared therefrom. To assist the gel formation (polymerization) reaction, said mixture comprising the fillers and gel precursors further comprises a catalyst (e.g. ammonia as 5% vol ammonia in ethanol). A gel is typically formed between 4 minutes and 14 hours depending if a gel promoting step (e.g., catalyst, heat, etc.) is employed. Of course gel times may lie outside of this range depending on the concentration of species, identity of the species (type of filler, precursor, etc.), type of medium, reaction conditions (temperature, pressure, etc.) or others. For preparing the corresponding fiber-reinforced aerogel composites, the mixture is combined with a lofty batting or a felt prior to gellation. The filler content used is between 1-50% wt relative to the final composite. The gel precursor concentration and volume of the mixture comprising the same are chosen based on the desired target density of the final gel. Once the gel is formed, it is treated with HMDZ and subjected to aging under basic conditions, and kept in a quiescent state. The gel is rinsed to remove water and base. Next the strengthened gel is placed in an autoclave and subjected to drying via supercritical $CO_2$.

Example 3

Ferrocene or a derivative thereof is obtained from Yixing Weite Petrochemical Additives Plant. The ferrocene fillers and are first dispersed in an ethanol and/or water medium. The mixture may be mixed and/or agitated as necessary to achieve a uniform dispersion of fillers in said medium. Mixing/agitation times typically require about 1 hr, although longer times may be needed to achieve a uniform dispersion. Said dispersion is combined with a solution comprising partially hydrolyzed ethylpolysilicates (gel precursors) wherein a gel is prepared therefrom. To assist the gel formation (polymerization) reaction, said mixture comprising the fillers and gel precursors further comprises a catalyst (e.g. ammonia as 5% v:v ammonia in ethanol). A gel is typically formed between 4 minutes and 14 hours depending if a gel promoting step (e.g., catalyst, heat, etc.) is employed. Of course gel times may be lie outside of this range depending on the concentration of species, identity of the species (type of filler, precursor, etc.), type of medium, reaction conditions (temperature, pressure, etc.) or others. For preparing the corresponding fiber-reinforced aerogel composites, the mixture is combined with a lofty batting or a felt prior to gellation. The filler content used is between 1-50% wt relative to the final composite. The gel precursor concentration and volume of the mixture comprising the same are chosen based on the desired target density of the final gel. Once the gel is formed, it is subjected to aging via HMDZ, and kept in a quiescent state. Next the strengthened gel is placed in an autoclave and subjected to drying via supercritical $CO_2$.

Example 4

NYAD® 5000, a commercially available form of Wollastonite from NYCO Minerals Inc. is used as filler. Nyad® 5000 fillers and are first dispersed in an ethanol and/or water medium. The mixture may be mixed and/or agitated as necessary to achieve a uniform dispersion of fillers in said medium. Mixing/agitation times typically require about 1 hr, although longer times may be needed to achieve a uniform dispersion. Said dispersion is combined with a solution comprising partially hydrolyzed ethylpolysilicates (gel precursors) wherein a gel is prepared therefrom. To assist the gel formation (polymerization) reaction, said mixture comprising the fillers and gel precursors further comprises a catalyst (e.g. ammonia as 5% v:v ammonia in ethanol). A gel is typically formed between 4 minutes and 14 hours depending if a gel promoting step (e.g., catalyst, heat, etc.) is employed. Of course gel times may lie outside of this range depending on the concentration of species, identity of the species (type of filler, precursor, etc.), type of medium, reaction conditions (temperature, pressure, etc.) or others. For preparing the corresponding fiber-reinforced aerogel composites, the mixture is combined with a lofty batting or a felt prior to gellation. The filler content used is between 1-50% wt relative to the final composite. The gel precursor concentration and volume of the mixture comprising the same are chosen based on the desired target density of the final gel. Once the gel is formed, it is treated with HMDZ and subjected to aging under basic conditions, and kept in a quiescent state. The gel is rinsed to remove water and base. Next the strengthened gel is placed in an autoclave and subjected to drying via supercritical $CO_2$.

Example 5

Bicyclophosphates with alkoxysilyl moieties are used as filler. These fillers and are first dissolved in an ethanol and/or water medium. The mixture may be mixed and/or agitated as necessary to achieve a uniform solution of fillers in said medium. Mixing/agitation times typically require about 1 hr, although longer times may be needed to achieve a uniform solution. Said mixture is combined with a solution comprising partially hydrolyzed ethylpolysilicates gel precursors) wherein a gel is prepared therefrom. To assist the gel formation (polymerization) reaction, said mixture comprising the fillers and gel precursors further comprises a catalyst (e.g. ammonia as 5% v:v ammonia in ethanol). A gel is typically formed between 4 minutes and 14 hours depending if a gel promoting step (e.g., catalyst, heat, etc.) is employed. Of course gel times may lie outside of this range depending on the concentration of species, identity of the species (type of filler, precursor, etc.), type of medium, reaction conditions (temperature, pressure, etc.) or others. For preparing the corresponding fiber-reinforced aerogel composites, the mixture is combined with a lofty batting or a felt prior to gellation. The filler content used is between 1-50% wt relative to the final composite. The gel precursor concentration and volume of the mixture comprising the same are chosen based on the desired target density of the final gel. Once the gel is formed, it is treated with HMDZ and subjected to aging under basic conditions, and kept in a quiescent state. The gel is rinsed to remove water and base. Next the strengthened gel is placed in an autoclave and subjected to drying via supercritical $CO_2$.

Example 6

3N® ZS-232, a commercially available form of zinc stannate from 3N International, Inc. is used as filler. 3N® ZS-232 fillers and are first dispersed in an ethanol and/or water medium. The mixture may be mixed and/or agitated as necessary to achieve a uniform dispersion of fillers in said medium. Mixing/agitation times typically require about 1 hr, although longer times may be needed to achieve a uniform dispersion. Said dispersion is combined with a solution comprising partially hydrolyzed ethylpolysilicates (gel precursors) wherein a gel is prepared therefrom. To assist the gel formation (polymerization) reaction, said mixture comprising the fillers and gel precursors further comprises a catalyst (e.g. ammonia as 5% v:v ammonia in ethanol). A gel is typically formed between 4 minutes and 14 hours depending if a gel promoting step (e.g., catalyst, heat, etc.) is employed. Of course gel times may lie outside of this range depending on the concentration of species, identity of the species (type of filler, precursor, etc.), type of medium, reaction conditions (temperature, pressure, etc.) or others. For preparing the corresponding fiber-reinforced aerogel composites, the mixture is combined with a lofty batting or a felt prior to gellation. The filler content used is between 1-50% wt relative to the final composite. The gel precursor concentration and volume of the mixture comprising the same are chosen based on the desired target density of the final gel. Once the gel is formed, it is treated with HMDZ and subjected to aging under basic conditions, and kept in a quiescent state. The gel is rinsed to remove water and base. Next the strengthened gel is placed in an autoclave and subjected to drying via supercritical $CO_2$.

Example 7

LT grade 3N® Brand antimony trioxide, a commercially available form of Antimony oxide from 3N International, Inc. is used as filler. The LT grade 3N® Brand antimony trioxide fillers are first dispersed in an ethanol and/or water medium. This mixture may be mixed and/or agitated as necessary to achieve a uniform dispersion of fillers in said medium. Mixing/agitation times typically require about 1 hr, although longer times may be needed to achieve a uniform dispersion. Said dispersion is combined with a solution comprising partially hydrolyzed ethylpolysilicates (gel precursors) wherein a gel is prepared therefrom. To assist the gel formation (polymerization) reaction, said mixture comprising the fillers and gel precursors further comprises a catalyst (e.g. ammonia as 5% v:v ammonia in ethanol). A gel is typically formed between 4 minutes and 14 hours depending if a gel promoting step (e.g., catalyst, heat, etc.) is employed. Of course gel times may lie outside of this range depending on the concentration of species, identity of the species (type of filler, precursor, etc.), type of medium, reaction conditions (temperature, pressure, etc.) or others. For preparing the corresponding fiber-reinforced aerogel composites, the mixture is combined with a lofty batting or a felt prior to gellation. The filler content used is between 1-50% wt relative to the final composite. The gel precursor concentration and volume of the mixture comprising the same are chosen based on the desired target density of the final gel. Once the gel is formed, it is treated with HMDZ and subjected to aging under basic conditions, and kept in a quiescent state. The gel is rinsed to remove water and base. Next the strengthened gel is placed in an autoclave and subjected to drying via supercritical $CO_2$.

Example 8

Hydrated alumina, commercially available from Alcoa, Inc. is used as filler. Hydrated alumina fillers are first dispersed in an ethanol and/or water medium. This mixture may be mixed and/or agitated as necessary to achieve a uniform dispersion of fillers in said medium. Mixing/agitation times typically require about 1 hr, although longer times may be needed to achieve a uniform dispersion. Said dispersion is combined with a solution comprising partially hydrolyzed ethylpolysilicates (gel precursors) wherein a gel is prepared therefrom. To assist the gel formation (polymerization) reaction, said mixture comprising the fillers and gel precursors further comprises a catalyst (e.g. ammonia as 5% v:v ammonia in ethanol). A gel is typically formed between 4 minutes and 14 hours depending if a gel promoting step (e.g., catalyst, heat, etc.) is employed. Of course gel times may lie outside of this range depending on the concentration of species, identity of the species (type of filler, precursor, etc.), type of medium, reaction conditions (temperature, pressure, etc.) or others. For preparing the corresponding fiber-reinforced aerogel composites, the mixture is combined with a lofty batting or a felt prior to gellation. The filler content used is between 1-50% wt relative to the final composite. The gel precursor concentration and volume of the mixture comprising the same are chosen based on the desired target density of the final gel. Once the gel is formed, it is treated with HMDZ and subjected to aging under basic conditions, and kept in a quiescent state. The gel is rinsed to remove water and base. Next the strengthened gel is placed in an autoclave and subjected to drying via supercritical $CO_2$.

Example 9

Montana Brand "Low Tint" Antimony Oxide produced by United States Antimony Corporation is used as filler. The fillers are first dispersed in an ethanol and/or water medium. This mixture may be mixed and/or agitated as necessary to achieve a uniform dispersion of fillers in said medium. Mixing/agitation times typically require about 1 hr, although longer times may be needed to achieve a uniform dispersion. Said dispersion is combined with a solution comprising partially hydrolyzed ethylpolysilicates (gel precursors) wherein a gel is prepared therefrom. To assist the gel formation (polymerization) reaction, said mixture comprising the fillers and gel precursors further comprises a catalyst (e.g. ammonia as 5% v:v ammonia in ethanol). A gel is typically formed between 4 minutes and 14 hours depending if a gel promoting step (e.g., catalyst, heat, etc.) is employed. Of course gel times may lie outside of this range depending on the concentration of species, identity of the species (type of filler, precursor, etc.), type of medium, reaction conditions (temperature, pressure, etc.) or others. For preparing the corresponding fiber-reinforced aerogel composites, the mixture is combined with a lofty batting or a felt prior to gellation. The filler content used is between 1-50% wt relative to the final composite. The gel precursor concentration and volume of the mixture comprising the same are chosen based on the desired target density of the final gel. Once the gel is formed, it is treated with HMDZ and subjected to aging under basic conditions, and kept in a quiescent state. The gel is rinsed to remove water and base. Next the strengthened gel is placed in an autoclave and subjected to drying via supercritical $CO_2$.

Example 10

3N® ZS-232, from 3N International, Inc. and Hydrated alumina, from Alcoa, Inc are combined in 1:1 stoichiometric ratio as fillers. The fillers are first dispersed in an ethanol and/or water medium. This mixture may be mixed and/or agitated as necessary to achieve a uniform dispersion of fillers in said medium. Mixing/agitation times typically require about 1hr, although longer times may be needed to achieve a uniform dispersion. Said dispersion is combined with a solution comprising partially hydrolyzed ethylpolysilicates (gel precursors) wherein a gel is prepared therefrom. To assist the gel formation (polymerization) reaction, said mixture comprising the fillers and gel precursors further comprises a catalyst (e.g. ammonia as 5% v:v ammonia in ethanol). A gel is typically formed between 4 minutes and 14 hours depending if a gel promoting step (e.g., catalyst, heat, etc.) is employed. Of course gel times may lie outside of this range depending on the concentration of species, identity of the species (type of filler, precursor, etc.), type of medium, reaction conditions (temperature, pressure, etc.) or others. For preparing the corresponding fiber-reinforced aerogel composites, the mixture is combined with a lofty batting or a felt prior to gellation. The filler content used is between 1-50% wt relative to the final composite. The gel precursor concentration and volume of the mixture comprising the same are chosen based on the desired target density of the final gel. Once the gel is formed, it is treated with HMDZ and subjected to aging under basic conditions, and kept in a quiescent state. The gel is rinsed to remove water and base. Next the strengthened gel is placed in an autoclave and subjected to drying via supercritical $CO_2$.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. An aerogel composition comprising (i) a fibrous structure, (ii) a silica aerogel material within the fibrous structure, and (iii) a smoke suppressing filler, the smoke suppressing filler comprising hydroxides, borates, silicates, carbonates, oxides, or combinations thereof, at least a portion of the smoke suppressing filler being in hydrated form, wherein the smoke suppressing filler comprises particles embedded within the aerogel.

2. The aerogel composition of claim 1, wherein the particles of smoke suppressing filler have a size of less than 100μm.

3. The aerogel composition of claim 1, wherein the composition is hydrophobic.

4. The aerogel composition of claim 3, wherein the silica aerogel material includes covalently attached hydrophobic materials.

5. The aerogel composition of claim 1, wherein a majority of the smoke suppressing filler is in hydrated form.

6. The aerogel compositions of claim 1, wherein the hydroxides comprise metal hydroxides.

7. The aerogel composition of claim 6, wherein the metal hydroxides comprise magnesium hydroxide.

8. The aerogel composition of claim 6, wherein the metal hydroxides comprise aluminum hydroxide.

9. The aerogel composition of claim 6, wherein the metal hydroxides are present at a level of 1 to 40 percent by weight of the aerogel composite.

10. The aerogel composition of claim 1, wherein the borates comprise zinc borate.

11. The aerogel composition of claim 10, wherein the zinc borate is present at a level of 1 to 40 percent by weight of the aerogel composite.

12. The aerogel composition of claim 1, wherein the silicates comprise aluminum silicate.

13. The aerogel composition of claim 12, wherein the aluminum silicate is present at a level of less than 50 percent by weight of the aerogel composite.

14. The aerogel composition of claim 12, wherein the aluminum silicate is present at a level of 5 to 50 percent by weight of the aerogel composite.

15. The aerogel composition of claim 1, wherein the carbonates comprise a hydrated metal carbonate.

16. The aerogel composition of claim 15, wherein the hydrated metal carbonate is present at a level of 1 to 40 percent by weight of the aerogel composite.

17. The aerogel composition of claim 1, wherein the oxides comprise aluminum oxide.

18. The aerogel composition of claim 17, wherein the aluminum oxide comprises aluminum oxide hydroxide.

19. The aerogel composition of claim 17, wherein the aluminum oxide is present at a level of less than 50 percent by weight of the aerogel composite.

20. The aerogel composition of claim 17, wherein the aluminum oxide is present at a level of 5 to 50 percent by weight of the aerogel composite.

21. The aerogel composition of claim 1, wherein the fibrous structure is in a woven, nonwoven, mat, felt, batting, or a combination thereof.

22. The aerogel composition of claim 1, wherein the silica aerogel material includes a silica aerogel in which the smoke suppressing filler is embedded, where the smoke suppressing filler is distinct from the silica aerogel.

23. An aerogel composition comprising (i) a flexible reinforcing structure and (ii) a silica aerogel material within the reinforcing structure, the silica aerogel material comprising: (a) an aerogel material and (b) a smoke suppressing filler, wherein the smoke suppressing filler comprises hydroxides, borates, silicates, carbonates, oxides, or combinations thereof; and at least a portion of the smoke suppressing filler being in hydrated form.

* * * * *